US009701795B2

(12) United States Patent
Auner et al.

(10) Patent No.: US 9,701,795 B2
(45) Date of Patent: *Jul. 11, 2017

(54) HALOGENATED POLYSILANE AND PLASMA-CHEMICAL PROCESS FOR PRODUCING THE SAME (75) Inventors: Norbert Auner, Glashuetten (DE); Christian Bauch, Bitterfeld-Wolfen (DE); Gerd Lippold, Leipzig (DE); Rumen Deltschew, Leipzig (DE); Seyed-Javad Mohsseni-Ala, Bitterfeld-Wolfen (DE)

(73) Assignee: Nagarjuna Fertilizers and Chemicals Limited., Hyderbad, Telangana (IN)

( * ) Notice: Subject to any disclaimer, the term of this patent is extended or adjusted under 35 U.S.C. 154(b) by 1610 days.

This patent is subject to a terminal disclaimer.

(21) Appl. No.: 12/995,173

(22) PCT Filed: May 27, 2009

(86) PCT No.: PCT/DE2009/000726
§ 371 (c)(1),
(2), (4) Date: Mar. 2, 2011

(87) PCT Pub. No.: WO2009/143823
PCT Pub. Date: Dec. 3, 2009

(65) Prior Publication Data
US 2011/0150740 A1 Jun. 23, 2011

(30) Foreign Application Priority Data
May 27, 2008 (DE) .......... 10 2008 025 261

(51) Int. Cl.
C01B 33/107 (2006.01)
C08G 77/60 (2006.01)
B01J 19/08 (2006.01)

(52) U.S. Cl.
CPC ............ C08G 77/60 (2013.01); B01J 19/088 (2013.01); *B01J 2219/0871* (2013.01); *B01J 2219/0883* (2013.01); *B01J 2219/0894* (2013.01)

(58) Field of Classification Search
CPC .............. B01J 19/088; B01J 2219/0871; B01J 2219/0883; B01J 2219/0894; C08G 77/60
USPC ..................... 204/157.45; 423/342
See application file for complete search history.

(56) References Cited

U.S. PATENT DOCUMENTS

| 4,374,182 A | 2/1983 | Gaul et al. |
| 2005/0142046 A1 | 6/2005 | Todd |
| 2007/0078252 A1 | 4/2007 | Dioumaev |
| 2009/0127093 A1 | 5/2009 | Auner |
| 2009/0169457 A1* | 7/2009 | Auner et al. .......... 423/342 |
| 2010/0004385 A1 | 1/2010 | Auner et al. |
| 2010/0080746 A1 | 4/2010 | Lang et al. |

FOREIGN PATENT DOCUMENTS

| DE | 955414 | 1/1957 |
| DE | 3126240 | 5/1982 |
| DE | 10 2005 024 041 | 11/2006 |
| DE | 102005024041 | 11/2006 |
| DE | 102006034061 | 1/2008 |
| DE | 102007007874 | 8/2008 |
| FI | 282232 B | 10/1990 |
| GB | 702349 | 1/1954 |
| JP | 59001505 A | 1/1984 |
| JP | 59182222 A | 10/1984 |
| JP | 63089414 A | 4/1988 |
| JP | 2010-521393 A | 6/2010 |
| WO | WO81/03168 | 11/1981 |
| WO | 2006-125425 A1 | 11/2006 |
| WO | WO2008/009473 | 1/2008 |
| WO | WO 2008/009473 | 1/2008 |
| WO | WO 2008009473 A1 * | 1/2008 |
| WO | WO2008/031427 | 3/2008 |
| WO | WO2008/09640 | 8/2008 |
| WO | 2008-110386 A1 | 9/2008 |

OTHER PUBLICATIONS

Herzog et al., "Heterosubstituted Polysilanes", Macromolecules, vol. 32, No. 1, pp. 2210-2214, Jan. 1, 1999.
P.L. Timms et al., "Silicon-Flourine Chemistry. I. Silicon Difluoride and Polyfluorosilanes", Journal of the American Chemical Society, vol. 87, pp. 2824-2828, 1965.
M. Schmeisser et al., "Siliciumdijoidi [SiJ2]x", Angew. Chem., vol. 76, p. 782, 1964.
29Si-NMR-Spektrum, kurzkettige verzweigte perchlorierten Silane. Besson A. et al., Comptes rendus, 151, (1911), pp. 1055-1057.
Das-Digitale Wörterbuch der deutschen Sprache des 20. Jh., Stichwort "Augenblick", Berlin Branden burgische Akademie der Wissenschaften.
Drodowski, G. et al., Augenblick, Duden-Das große Wörterbuch der deutschen Sprache, Dudenverlag, 1977, ISBN 3411013559, p. 235.
Falbe, J. et al., Energie, Römpp Chemi Lexikon, Band 2, Georg Thime Verlag Stuttgart, 1990 ISBN 3137347092.
Falbe, J. et al., Leistung, Römpp Chemi Lexikon, Band 3, Georg Thime Verlag Stuttgart, 1990 ISBN 3137348099.
Falbe, J. et al., Raman-Spektroskopie, Römpp Chemi Lexikon, Band 5, Georg Thime Verlag Stuttgart, 1995.
Falbe et al., Verzweig, Römpp Chemi Lexikon, Band 5, Georg Thime Verlag Stuttgart, 1995.
Hassler K., et al., Journal of Molecular Structure, The Infrared and raman spectra of octachloro-and octabromocyclotetrasilane, 66 (1980), 25-30.

(Continued)

Primary Examiner — Jessee Roe
Assistant Examiner — Jenny Wu
(74) Attorney, Agent, or Firm — Enshan Hong; Kent H. Cheng; VLP Law Group LLP (57) ABSTRACT The present invention relates to a halogenated polysilane as a pure compound or a mixture of compounds each having at least one direct Si—Si bond, whose substituents consist exclusively of halogen or of halogen and hydrogen and in the composition of which the atomic ratio of substituent to silicon is at least 1:1.

2 Claims, 11 Drawing Sheets (56) References Cited

OTHER PUBLICATIONS

Hassler K., et al., Journal of Organometallic Chemistry, Synthese and Eigenschaften einiger Iodtrisilane, 480 (1994) 173-175.
Hengge E., et al., Angewandte Chemie, 93 (1981)pp. 698-701.
Hengge E., et al. Monatshefte fur Chemie, 101, (1970), pp. 1068-1073.
Hertwig, et al. Uber Siliciumsubchloride, Zeitschrift fur Naturforschung, 1951, pp. 336-337.
Hohenberg P. et al., Inhomogeneous Electron Gas, Phys. Rev. B. (1964), 136:864-71.
Koch W. et al, A Chemists' Guid to Density Functional Theory, Wiley, Weinheim, $2^{nd}$ edn. (2000).
Koe, Julian R. , et al., Perchlorpolysilan: Kristallstruktur, Festkorper-29Si-NMR-Spektroskopie und Reaktionen, Angew. Chem. (1998), vol. 110, No. 10.
Kohlrausch, K., Ramanspektren, Akademische Verlagsgesellschaft Becker & Erler Kom.-Ges., 1943, pp. 28.
Kohn W., et al., Self-Consistent Equations Including Exchange and Correlation Effects, Phys. Rev. A (1965) 140:1133-38.
Rossiter B., et al., Physical Methods of Chemistry, vol. IIIA, Determination of Chemical Composition and Molecular Structure Part A, (1987).
Rutscher, A. et al., Plasmatechnik: Grundlagen und Anwendungen, carl Hanser Verlag, (1984).
Schenk P.W. et al., Darstellugn und Eigenschaften des Siliciumdichlorids (SiCl2)x, Z. anorg. Allg. Chem. (1964) No. 334, pp. 57-65.
Schmeisser M., Internationale Union fur Reine und Angewandte Chemie, Angewandte Chemie, 66 (1954), pp. 713-714.
Schmeisser M. et al., Uber das Siliciumchlorid [SiCl2]x, Z. anorg. Allg. Chem. (1964) No. 334, pp. 50-56.
Schrader, B., Infrared and Raman Spectroscopy-Methods and Applications, VCH Weinheim, 1995, pp. 35.
Stuger H., et al., Zeitschrift fur allgemeine and anorganische Chemie, 621 (1995), pp. 1517-1522.
Vogel H., GerthsenPhysik, Springer Verlag, 1999 ISBN 3540654798, pp. 463-476.
Wiberg N. Lehrbuch der Anorganischen Chemie, Walter de Gruyter Verlag, 2007, 102. Auflage, ISBN 9783110177701.
Wiberg N., Holleman-Wiberg Lehrbuch der Anorganischen Chemie, Walter de Gruyter Verlag, 1995, 101 Auflage, ISBN 3110120419 p. 906.
Zink, R. et al., Transoid, Ortho, and Gauche Conromers of n-Si4Cl10: Raman and Mid-IR Matrix-Isolation Spectra, J. Phys. Chem. 2000, pp. 3829-3841.
English Translation of Office Action issued Feb. 5, 2013 in Ukraine counterpart Application No. a201014141 filed May 27, 2009.
Third party observation filed on Sep. 3, 2013 in connection with German corresponding patent application No. DE 10 2008 025 261.
Article downloaded from http://de.wikipedia.org/wiki/Plasmalampe on Aug. 27, 2013.
Schwarz u. G. Pietsch, Z. anorg. allg. Chem. 232, 249 [1937].
Office Action issued Dec. 6, 2013 for the Japanese counterpart application No. 2011-510823.
Schenk, P.W.,Handbookof Preparative Inorganic Chemistry,vol. 1, 2nd edition, pp. 682-686 (1963).
Wissenschaftlicher Rat—Duden—Das Große Wörterbuch der deutschen Sprache (Eintrag—Augenblick) (1976).
Schmeisser et al., Fortschritte der Chemischen Forschung (1967).
Vollmer, Adam et al., Römpp (Eintrag—Kältemischungen (2014).
Hollemann et al., Lehrbuch der Anorganischen Chemie (1995).

\* cited by examiner

HALOGENATED POLYSILANE AND PLASMA-CHEMICAL PROCESS FOR PRODUCING THE SAME

RELATED APPLICATIONS

This is a U.S. national stage of application No. PCT/DE2009/000726, filed on May 27, 2009.

This application claims the priority of German application no. 10 2008 024 261.1 filed May 27, 2008, the entire content of which is hereby incorporated by reference.

BACKGROUND OF THE INVENTION

The present invention relates to a halogenated polysilane as a pure compound or a mixture of compounds each having at least one direct Si—Si bond, whose substituents consist exclusively of halogen or of halogen and hydrogen and in the composition of which the atomic ratio of substituent to silicon is at least 1:1.

Chlorinated polysilanes of this kind are known in the prior art [references: DE 10 2005 024 041 A1; DE 10 2006 034 061 A1; WO 2008/031427 A2; WO 81/03168; US 2005/0142046 A1; M. Schmeisser, P. Voss "Über das Siliciumchlorid $[SiCl_2]_x$", Z. anorg. allg. Chem. (1964) 334, 50-56 (Schmeisser, 1964); US 2007/0078252 A1; DE 31 26 240 C2; UK 703,349]. On the one hand they can be produced in a purely thermal reaction (Schmeisser, 1964) by heating chlorosilanes in vapor form with or without a reducing agent at relatively high temperatures (above 700° C.). The chlorinated polysilanes obtained have a faint coloration from dirty-yellow to yellowish-light-brown (Schmeisser, 1964; "slightly greenish-yellow, glass-like, high-polymer"). Spectroscopic investigations have shown that these polysilanes produced purely thermally have a high proportion of short-chain, branched and cyclic molecules. Furthermore, the mixture obtained is heavily contaminated with $AlCl_3$ owing to the production conditions (very high temperatures).

GB 702,349 discloses that when silicon alloys are reacted with chlorine gas at 190-250° C. a mixture of chlorinated polysilanes is condensed from the gas stream. The average molecular weight of these mixtures is relatively low, because on distillation only 2% of the silanes have n greater than 6.

DE 31 26 240 C2 describes the wet-chemical production of chlorinated polysilanes from $Si_2Cl_6$ by reaction with a catalyst. The mixtures obtained still contain the catalyst and are therefore washed with organic solvents, so that traces of this solvent and of the catalyst remain. Moreover, PCS obtained in this way are strongly branched. Other wet-chemical methods are presented in US 2007/0078252 A1;

1. Reduction of halogenated aryloligosilanes with sodium followed by cleavage with $HCl/AlCl_3$ aromatics.
2. Transition-metal-catalyzed dehydrogenating polymerization of arylated H-silanes and subsequent dearylation with $HCl/AlCl_3$.
3. Anionically catalyzed ring-opening polymerization (ROP) of $(SiCl_2)_5$ with TBAF $(Bu_4NF)$.
4. ROP of $(SiAr_2)_5$ with TBAF or $Ph_3SiK$ and subsequent dearylation with $HCl/AlCl_3$.

With all these methods, once again PCS contaminated with solvent/catalyst are obtained.

In H. Stüger, P. Lassacher, E. Hengge, Zeitschrift für allgemeine und anorganische Chemie 621 (1995) 1517-1522, $Si_5Cl_9H$ is converted to the corresponding bis-cyclopentasilane $Si_{10}Cl_{18}$ by boiling with $Hg(tBu_2)$ in heptane. Alternatively, cyclization of $Si_5Ph_9Br$ with naphthyllithium or K and/or Na/K can be performed in various solvents with subsequent halogenation with $HCl/AlCl_3$.

Production of halogenated polysilanes of this kind by a plasma-chemical process is also known. For example, DE 10 2005 024 041 A1 relates to a method of production of silicon from halosilanes, in which in a first step the halosilane is converted to a halogenated polysilane with production of a plasma discharge, and this is then decomposed to silicon in a second step, with heating. In this known method, in connection with production of the plasma, high energy densities are used (above 10 $Wcm^{-3}$), and the end product is a not very compact, waxy-white to yellowish-brown or brown solid. Spectroscopic investigations showed that the end product obtained has a relatively high degree of cross-linking. The high energy densities used lead to products of high molecular weights, resulting in insolubility and low fusibility.

Furthermore, WO 81/03168 describes a high-pressure plasma process for synthesis of $HSiCl_3$, in which PCS are formed as minor by-products. As these PCS are produced at extremely high gas temperatures, they are relatively short-chained and strongly branched. Moreover, this PCS has a high H content, owing to the hydrogenating conditions ($HSiCl_3$ synthesis!). US 2005/0142046 A1 describes PCS production by silent electric discharge in $SiCl_4$ at normal pressure. Only short-chain polysilanes are formed, as is demonstrated by the author with the selective reaction of $SiH_4$ to $Si_2H_6$ and $Si_3H_8$ by connecting several reactors in series. The situation is similar according to DE 10 2006 034 061 A1, in which a similar reaction is described, in which gaseous and liquid PCS are obtained, with $Si_2Cl_6$ as the main constituent (p. 3, [00161]). Admittedly the authors describe how the molecular weights of the PCS can be increased by using several reactors connected in series, but it is only possible to obtain material that can be converted undecomposed to the gas phase. This situation is also expressed by the authors in the claims, in which they envisage distillations for all PCS mixtures obtained.

In addition to chlorinated polysilanes, other halogenated polysilanes $Si_xX_y$ (X=F, Br, I) are also known in the prior art.

E. Hengge, G. Olbrich, Monatshefte für Chemie 101 (1970) 1068-1073 describes the production of a polymer with a sheet structure $(SiF)_x$. The sheet-structure polymers $(SiCl)_x$ or $(SiBr)_x$ are obtained from $CaSi_2$ by reaction with ICl or IBr. A halogen exchange is then performed with $SbF_3$. However, partial degradation of the Si layer structure occurs. The resultant product contains the amount of $CaCl_2$ based on stoichiometry from $CaSi_2$, and this cannot be washed out.

The production of polyfluorosilane $(SiF_2)_x$ is described for example in M. Schmeisser, Angewandte Chemie 66 (1954) 713-714. $SiBr_2F_2$ reacts at room temperature in ether with magnesium to a yellow, high-polymer $(SiF_2)_x$. Compounds such as $Si_{10}Cl_{22}$, $(SiBr)_x$ and $Si_{10}Br_{16}$ can be rehalogenated with $ZnF_2$ to the corresponding fluorides. The standard method of production of $(SiF_2)_x$ is presented for example in P. L. Timms, R. A. Kent, T. C. Ehlert, J. L. Margrave, Journal of the American Chemical Society 87 (1965) 2824-2828. In this, $(SiF_2)_x$ is produced by leading $SiF_4$ over silicon at 1150° C. and 0.1-0.2 torr and freezing out the resultant $SiF_2$ at −196° C. with polymerization during subsequent thawing. The colorless to pale yellow plastic polymer melts on heating to 200-350° C. in vacuum and releases perfluorinated silanes from $SiF_4$ to at least $Si_{14}F_{30}$. A silicon-rich polymer $(SiF)_x$ remains, which at 400±10° C. decomposes vigorously to $SiF_4$ and Si. The lower perfluoropolysilanes are colorless liquids or crystalline solids, which can be isolated by fractional condensation in purities >95%.

Traces of secondary or tertiary amines catalyze the polymerization of perfluoro-oligosilanes.

FI 82232 B discloses a reaction at even higher temperature. $SiF_4$ reacts with Si in an Ar-plasma flame to $SiF_2$ (0.8:1 mol, 70% $SiF_2$ content).

Short-chain perbrominated polysilanes are formed, according to A. Besson, L. Fournier, Comptes rendus 151 (1911) 1055-1057. An electric discharge in gaseous $HSiBr_3$ produces $SiBr_4$, $Si_2Br_6$, $Si_3Br_3$ and $Si_4Br_{10}$.

K. Hassler, E. Hengge, D. Kovar, Journal of molecular structure 66 (1980) 25-30 prepare cyclo-$Si_4Br_8$ by reaction of $(SiPh_2)_4$ with HBr under $AlBr_3$ catalysis. In H. Stüger, P. Lassacher, E. Hengge, Zeitschrift für allgemeine and anorganische Chemie 621 (1995) 1517-1522, $Si_5Br_9H$ is converted to the corresponding bis-cyclopentasilane $Si_{10}Br_{18}$ by boiling with $Hg(tBu_2)$ in heptane. Alternatively, cyclization of $Si_5Ph_9Br$ with naphthyllithium or K or Na/K can be performed in various solvents with subsequent halogenation with $HBr/AlBr_3$.

High-molecular silicon sub-bromides can be prepared, according to M. Schmeisser, Angewandte Chemie 66 (1954) 713-714, on the one hand by reaction of $SiBr_4$ with magnesium in ether in the form of the yellow, solid $(SiBr)_x$, and on the other hand by the action of $SiBr_4$ on elemental Si at 1150° C., which in addition to $(SiBr)_x$ also produces $Si_2Br_6$ and other oligosilanes such as $Si_{10}Br_{16}$.

DE 955414 B also discloses a reaction at high temperature. If $SiBr_4$ or $Br_2$ in vapor form are led in vacuum at 1000-1200° C. through silicon grit, there is mainly formation of $(SiBr_2)_x$, along with a little $Si_2Br_6$.

The ring-opening polymerization of cyclo-$Si_5Br_{10}$ and cyclo-$Si_5I_{10}$ by the action of $Bu_4NF$ in THF or DME is claimed in US 2007/0078252 A1.

For example E. Hengge, D. Kovar, Angewandte Chemie 93 (1981) 698-701 or K. Hassler, U. Katzenbeisser, Journal of organometallic chemistry 480 (1994) 173-175 report on the production of short-chain periodated polysilanes. By reacting the phenylcyclosilanes $(SiPh_2)_n$ (n=4-6) or $Si_3Ph_8$ with HI under $AlI_3$ catalysis, the periodated cyclosilanes $(SiI_2)_n$ (n=4-6) or $Si_3I_8$ are formed. M. Schmeisser, K. Friederich, Angewandte Chemie (1964) 782 describe various routes for the production of periodated polysilanes. $(SiI_2)_x$ is produced at approx. 1% yield when $SiI_4$ vapor is led over elemental silicon at 800-900° C. at high vacuum. The pyrolysis of $SiI_4$ in the same conditions gives the same product, which is very sensitive to hydrolysis and is soluble in benzene. Under the action of a glow discharge on $SiI_4$ vapors at high vacuum, a solid, amorphous, reddish-yellow silicon sub-iodide of the composition $(SiI_{2.2})_x$, insoluble in all the usual solvents, is obtained at a yield of 60 to 70% (relative to $SiI_4$). Pyrolysis of this substance at 220 to 230° C. at high vacuum leads to a dark red $(SiI_2)_x$, with $SiI_4$ and $Si_2I_6$ being formed simultaneously. The chemical properties of the resultant compounds $(SiI_2)_x$ coincide—except for solubility in benzene. Pyrolysis of $(SiI_2)_x$ at 350° C. at high vacuum produces $SiI_4$, $Si_2I_6$ and an orange-red, friable solid with the composition $(SiI)_x$. $(SiI_2)_x$ reacts with chlorine or bromine between −30° C. and +25° C. to benzene-soluble, mixed silicon subhalides such as $(SiClI)_x$ and $(SiBrI)_x$. At higher temperatures the Si—Si chains are cleaved by chlorine or bromine with simultaneous total substitution of the iodine. Compounds of the type $Si_nX_{2n+2}$ (n=2-6 for X=Cl, n=2-5 for X=Br) are obtained. $(SiI_2)_x$ reacts with iodine at 90 to 120° C. in a bomb tube completely to $SiI_4$ and $Si_2I_6$.

BRIEF SUMMARY OF THE INVENTION

The present invention is based on the task of creating a halogenated polysilane of the stated type that is particularly soluble and fusible. Furthermore, a method of production of said halogenated polysilane is to be provided.

According to a first embodiment, for a halogenated polysilane of the stated type, this task is solved in that
a) the halogen is chlorine,
b) the hydrogen content of the polysilane is less than 2 atom-%,
c) the polysilane contains hardly any short-chain branched chains and rings, the content of branching points of the short-chain fraction relative to the total product mixture being less than 1%,
d) it has a Raman molecular vibrational spectrum of $I_{100}/I_{132}>1$, where $I_{100}$ denotes the Raman intensity at 100 $cm^{-1}$ and $I_{132}$ denotes the Raman intensity at 132 $cm^{-1}$, and
e) in $^{29}$Si-NMR spectra its significant product signals are in the range of chemical shift from +15 ppm to −7 ppm.

In a second embodiment of the invention, for a halogenated polysilane of the stated type, the stated task is solved in that
a) the halogen is bromine, and
b) in $^{29}$Si-NMR spectra its significant product signals are in the range of chemical shift from −10 ppm to −42 ppm, from −48 ppm to −52 ppm and/or from −65 ppm to −96 ppm.

The halogenated polysilane described above preferably has typical Raman intensities at 110 $cm^{-1}$ to 130 $cm^1$, at 170 $cm^{-1}$ to 230 $cm^{-1}$, at 450 $cm^{-1}$ to 550 $cm^{-1}$ and at 940 $cm^{-1}$ to 1000 $cm^{-1}$.

The hydrogen content of this polysilane is preferably less than 4 atom-%.

In a third embodiment of the invention, the aforementioned task is solved according to the invention in that
a) the halogen is fluorine, and
b) in its $^{29}$Si-NMR spectrum it has significant product signals in the range of chemical shift from 8 ppm to −30 ppm and/or from −45 ppm to −115 ppm.

This fluorinated polysilane preferably has typical Raman intensities at approx. 180 $cm^{-1}$ to 225 $cm^{-1}$, at approx. 490 $cm^{-1}$ to 550 $cm^{-1}$ and at approx. 900 $cm^{-1}$ to 980 $cm^{-1}$.

The hydrogen content of this polysilane is preferably less than 4 atom-%.

In a fourth embodiment of the invention the aforementioned task is solved according to the invention in that
a) the halogen is iodine, and
b) in its $^{29}$Si-NMR spectrum it has significant product signals in the range of chemical shift from −20 ppm to −55 ppm, from −65 ppm to −105 ppm and/or from −135 ppm to −181 ppm.

This iodated polysilane preferably has typical Raman intensities at approx. 95 $cm^{-1}$ to 120 $cm^{-1}$, at 130 $cm^{-1}$ to 140 $cm^{-1}$, at 320 $cm^{-1}$ to 390 $cm^{-1}$ and at 480 $cm^{-1}$ to 520 $cm^{-1}$.

The hydrogen content of this polysilane is preferably less than 4 atom-%.

The invention also relates to a halogenated polysilane, which contains halogen substituents of several different halogens.

The $^{29}$Si-NMR spectra were recorded on a 250 MHz instrument of the Bruker DPX 250 type with the pulse sequence zg30 and were referenced against tetramethylsilane (TMS) as external standard [$\delta(^{29}Si)=0.0$]. The acquisition parameters are: TD=32 k, AQ=1.652 s, D1=10 s, NS=2400, O1P=−40, SW=400.

The Raman molecular vibrational spectra were determined with an XY 800 spectrometer from the company Dilor with tunable laser excitation (T-sapphire laser, pumped by Ar-ion laser) and a confocal Raman and luminescence microscope, with liquid-nitrogen-cooled CCD detector, measurement temperature equal to room temperature, excitation wavelengths in the visible region of the spectrum, among others 514.53 nm and 750 nm.

The term short-chain used here relates to those compounds for which n=2-6, where n is the number of Si atoms bound to each other directly. Therefore polymers for which n is greater than 6 are regarded as long-chain.

"Almost no" means that the mixture contains less than 2%. "Mainly" means that the content of the relevant constituent in the mixture is more than 50%.

"Backbone chain" comprises all silicon atoms of a compound that are joined together by Si—Si bonds.

The halogenated polysilane formed according to the invention is produced with considerably "milder" (energy density) plasma conditions. As a result, the polysilane produced, with relatively high average chains lengths (n=9-25), is readily soluble and readily fusible.

The degree of branching of the chlorinated polysilane was determined by $^{29}$Si-NMR spectroscopy. It was found that the chlorinated polysilanes produced using the process according to the invention have a low content of branched short-chain compounds, and their branching points represent a proportion of the total mixture of less than 1%. The branchings appeared in the $^{29}$Si-NMR spectrum in a region from $\delta$=−20 to −40 ppm and $\delta$=−65 to −90 ppm. In standard $^{29}$Si-NMR spectra of the chlorinated polysilanes according to the invention, only very few or even no resonances appear in these regions, which is a clear distinguishing feature compared with e.g. thermally produced chlorinated polysilanes, which have a high proportion of branching points. This is connected with the fact that the latter chlorinated polysilanes are thermodynamically more favorable than chlorinated polysilanes with unbranched chains and are therefore formed preferentially in the thermal reaction, whereas in the plasma process, which takes place far away from thermodynamic equilibrium, the thermodynamically more favorable branchings are less preferred.

The content of cyclosilanes was also determined by $^{29}$Si-NMR and Raman spectroscopy, and it was found that the content of small rings ($Si_4$, $Si_5$, $Si_6$) is very low.

Moreover, the chlorinated polysilanes formed according to the invention have a Raman molecular vibrational spectrum of $I_{100}/I_{132}>1$. In particular, in the low-frequency region there are strong Raman signals in the range from 95-110 cm$^{-1}$, whereas far weaker Raman intensities were measured in the range 120-135 cm$^{-1}$.

Chlorinated polysilanes produced purely thermally have an $I_{100}/I_{132}$ ratio of <1.

This may be explained as follows. For cyclic chlorinated polysilanes, theoretical, quantum-mechanical calculations show inter alia intensive characteristic modes between 120 cm$^{-1}$ and 135 cm$^{-1}$. In contrast, such calculations for linear halogenated polysilanes do not show any pronounced modes in this region. In contrast, the lowest-frequency, intensive modes of the linear compounds are displaced with increasing chain length to smaller wavenumbers. In the mixture of halogenated polysilanes they appear as Raman bands between 95 and 110 cm$^{-1}$. To that extent, the $I_{100}/I_{132}$ criterion provides information on the content of cyclic or linear molecules.

The halogenated polysilane produced according to the invention is further characterized in that it is soluble in many solvents, so that it can easily be removed from a reactor used for production. In particular the halogenated polysilane formed according to the invention has good solubility in inert solvents, such as $SiCl_4$, benzene, toluene, paraffin etc., and both at room temperature and in cold and hot or boiling solvents. This contrasts with the halogenated polysilane produced according to the aforesaid publication DE 10 2005 024 041 A1, which is not soluble at all or only to a slight extent in such solvents.

The halogenated polysilane according to the invention is preferably characterized in that its substituents consist exclusively of halogen or of halogen and hydrogen.

The halogenated polysilane formed according to the invention preferably has mainly long chains (on average: n=8 to 20).

The halogenated polysilane formed according to the invention also differs from the plasma-chemically produced polysilane of the stated prior art in that the polysilane raw mixture produced has a smaller average chain length. Thus, the average chain length of the resultant raw mixture of halogenated polysilane (average size of the backbone chain) is preferably n=8-20. After distilling-off the short-chain polysilanes n is preferably 15-25.

Another distinguishing criterion relative to the prior art is that the halogenated polysilane according to the invention has a low hydrogen content (less than 2 atom-% or less than 4 atom-%) and in particular contains less than 1 atom-% hydrogen.

Furthermore, the polysilane according to the invention, because it is produced in a plasma process, is of high purity with respect to contamination with doping agents/metals and solvents, which is another distinguishing feature relative to the wet-chemical methods of production of polysilanes, because in the last-mentioned methods, traces of solvents and metal-salt-type reagents always remain in the product. In particular, the high-purity polysilane obtained in a plasma process according to the invention meets the requirements for use in photovoltaics, i.e. it is of photovoltaic grade.

The halogenated polysilane is highly viscous to solid. As chlorinated polysilane it has a greenish-yellow to bright orange or reddish brown color and as brominated polysilane it is colorless to yellow.

The task stated above is further solved by a method of production of halogenated polysilane of the type described above by reacting halosilane with hydrogen with production of a plasma discharge, which is characterized in that it uses a mixture ratio of halosilane to hydrogen of 1:0-1:2 and, with respect to plasma discharge, with an energy density of less than 10 Wcm$^{-3}$.

The method according to the invention is characterized in that it employs "milder" plasma conditions than in the prior art, which with respect to the plasma discharge is reflected in an energy density of less than 10 Wcm$^{-3}$. Thus, the plasma-chemical process of the prior art employs energy densities of more than 10 Wcm$^{-3}$, whereas the process according to the invention preferably has energy densities of 0.2-2 Wcm$^{-3}$.

Energy density means the input of power at the moment of the gas discharge, divided by the excited gas volume.

Moreover, the process according to the invention is characterized, relative to the prior art, by a smaller proportion of hydrogen in the starting mixture. Thus, a mixture ratio of halosilane to hydrogen of 1:0-1:2 is employed according to the invention, so that there is a further marked reduction in the energy input per equivalent of halosilane to be decomposed. This is preferably about 850-1530 kJ/mol halosilane.

The process according to the invention is preferably carried out in a pressure range of 0.8-10 hPa. Generally this pressure range is higher than in the prior art for low-pressure gas discharges (e.g. DE 10 2005 024 041 A1), and it is decisive that in the process according to the invention the higher pressures can be achieved without supporting measures for the plasma discharge (for example high-voltage discharge), whereas this is definitely necessary in the prior art (DE 10 2005 024 041 A1). Without the aforementioned support, in the prior art it was only possible to work at pressures of less than 1 hPa.

The coupling-in of the desired lower powers is also achieved in the process according to the invention without supporting measures. Thus, in the process according to the invention, ignition can take place without any problem at 100 W.

Whereas, as mentioned, a mixture ratio of halosilane to hydrogen of 1:0-1:2 is employed in the process according to the invention, in the plasma-chemical process of the prior art this mixture ratio is 1:2-1:20 (DE 10 2005 024 041 A1; WO 81/03168).

Regarding the temperature of the reactor in which the process according to the invention is carried out, the reactor parts on which the halogenated polysilane is to be deposited are preferably maintained at a temperature from −70° C. to 300° C., in particular −20° C. to 280° C. Generally the temperature of the reactor is kept relatively low, to avoid formation of Si.

With the process according to the invention, product mixtures can preferably be produced whose molecules on average have 13-18 Si atoms.

For the process according to the invention, for example an electrical voltage or alternating electromagnetic fields can be used for producing the plasma discharge. High-frequency glow discharges at relatively low pressures (a few hPa) are preferred.

For the process according to the invention, a halosilane is used as the starting substance. Halosilane means, in the sense of the process according to the invention, compounds of the type $H_nSiX_{4-n}$ (X=F, Cl, Br, I; n=0-3) and mixtures thereof. However, halosilanes with mixed halogen substitution can also be used in the process according to the invention.

The gas mixture (halosilane and hydrogen) used in the process according to the invention can additionally be diluted with an inert gas and/or can contain admixtures, which promote plasma production. The admixture of inert gases is not, however, absolutely necessary in the process according to the invention.

In another embodiment of the process according to the invention, halosilane is added to the hydrogen stream, after the latter has passed through a plasma zone (remote plasma). In this case both the hydrogen gas and the halosilane can be diluted with an inert gas and/or can contain admixtures that promote plasma production. The halosilane can also be used diluted with hydrogen.

In the process according to the invention, preferably fluorosilanes or chlorosilanes are used as halosilane. An especially preferred starting compound is $SiCl_4$.

The halosilane:hydrogen volume ratio in the production of the halogenated polysilane is preferably 1:0 to 1:20, more preferably 1:0 to 1:2.

The invention is described below on the basis of examples.

DETAILED DESCRIPTION OF THE INVENTION

Example 1

A mixture of 500 sccm $H_2$ and 500 sccm $SiCl_4$ (1:1) is fed into a reactor made of quartz glass, the process pressure being kept constant in the range 1.6-1.8 hPa. Transition of the gas mixture to the plasma state is then effected by a high-frequency discharge, and the chlorinated polysilane that forms is deposited on the cooled (20° C.) quartz glass walls of the reactor. The power input is 400 W. After 2 hours the yellow to orange-yellow product is removed from the reactor by dissolving in a little $SiCl_4$. After removal of the $SiCl_4$ under vacuum, 91.1 g polysilane is left behind in the form of an orange-yellow viscous mass.

The average molecular weight is determined by cryoscopy as approx. 1700 g/mol, which for the chlorinated polysilane $(SiCl_2)_n$ or $Si_nCl_{2n+2}$ corresponds to an average chain length of approx. n=17 for $(SiCl_2)_n$ or approx. n=16 for $Si_nCl_{2n+2}$.

The ratio of Si to Cl in the product mixture is determined after decomposition by chloride titration according to Mohr as Si:Cl=1:2 (which corresponds to the empirical (analytical) formula $SiCl_2$).

Figure 1:
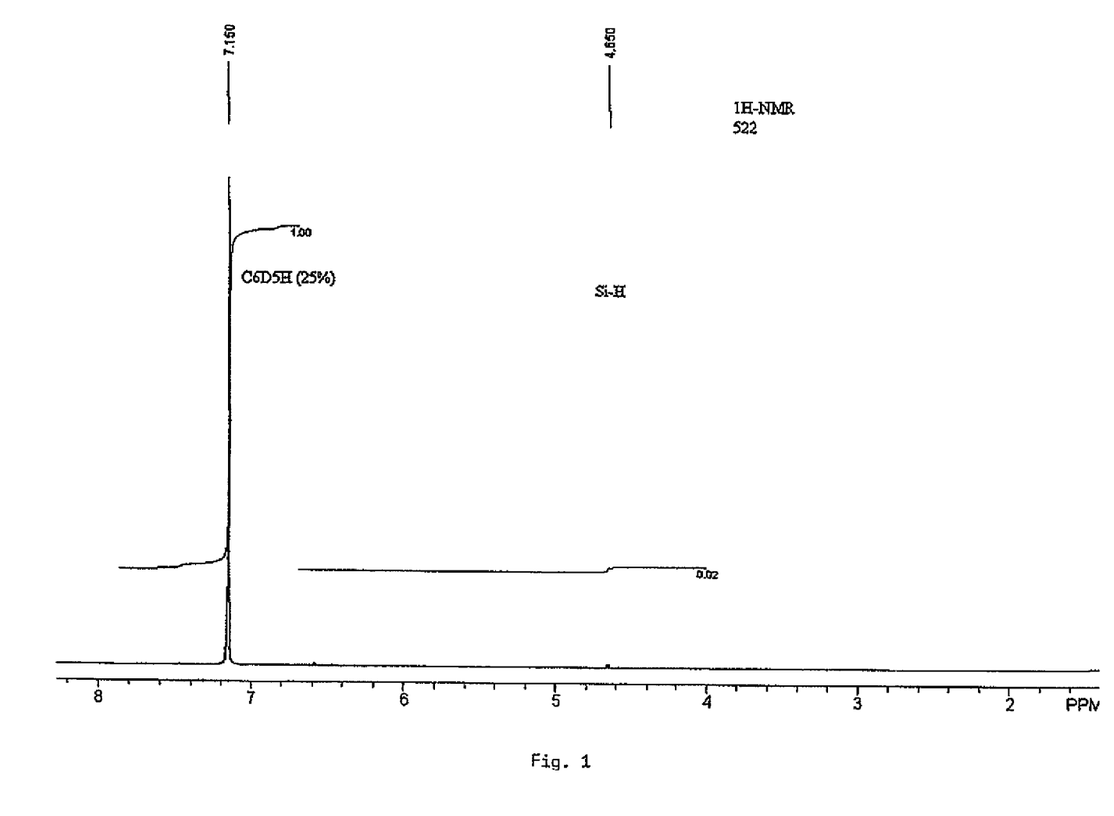
FIG. 1 shows the $^1$H-NMR spectrum of the chlorinated polysilane made by Example 1.

The hydrogen content is 0.0005 mass-% and accordingly well below 1 mass-% (as well as below 1 atom-%), as can be seen from the following $^1$H-NMR spectrum (FIG. 1). For this, the integrals of the solvent are compared at δ=7.15 ppm and of the product at δ=4.66 ppm. The content of the solvent $C_6D_6$ is approx. 25 mass-% and its degree of deuteration is 99%.

Figure 2:
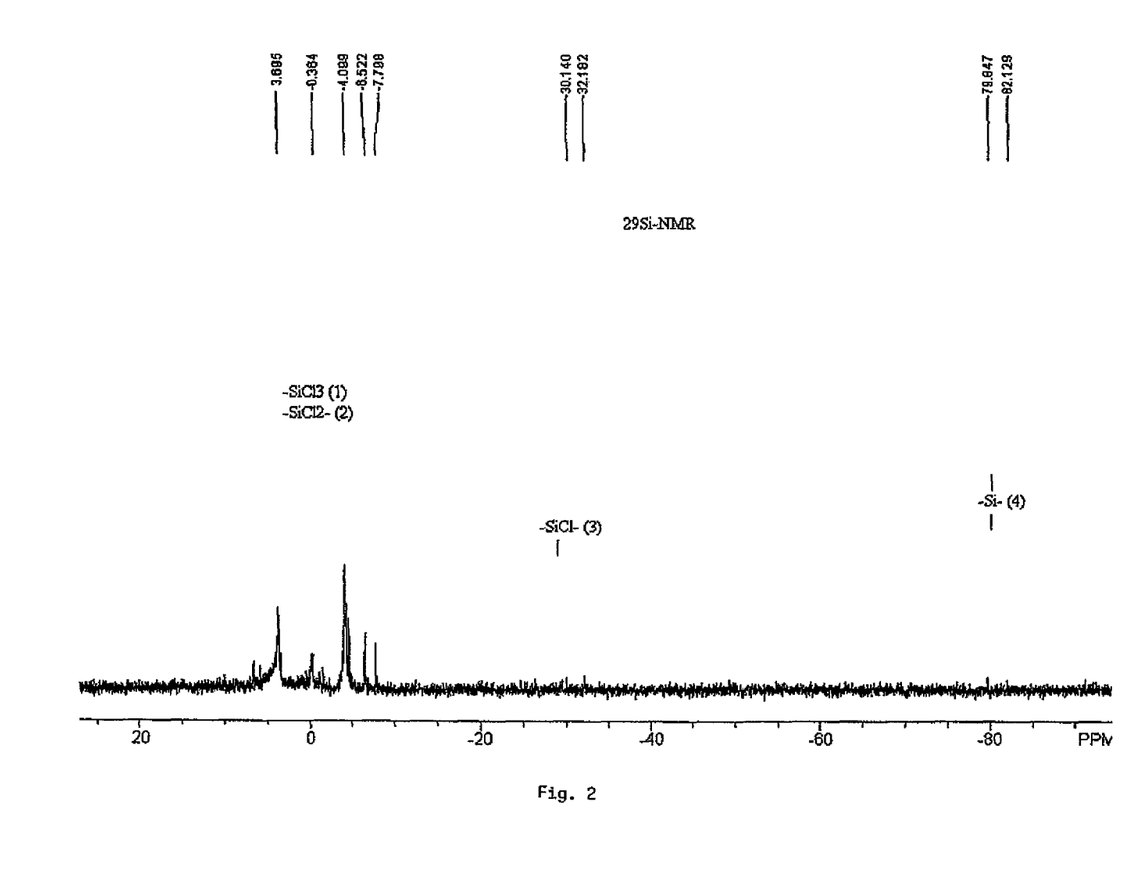
FIG. 2 shows the $^{29}$Si NMR spectrum of the chlorinated polysilane made by Example 1.

Typical $^{29}$Si-NMR shifts at approx. 3.7 ppm, −0.4 ppm, −4.1 ppm and −6.5 ppm can be seen from the following spectrum (FIG. 2). These signals are within the range of shifts for (1) and (2), which is typical of signals of $SiCl_3$ end groups (primary Si atoms), and (2), which is typical of signals of SiCl$_2$ groups (secondary Si atoms), such as they are present for example as connecting links in the region of linear chains.

The low content of short-chain branched compounds, e.g. decachloroisotetrasilane (among others δ=−32 ppm), dodecachloroneopentasilane (among others δ=−80 ppm) can also be seen from the next $^{29}$Si-NMR spectrum (FIG. 2). By integration of the $^{29}$Si-NMR spectra it can be seen that the content of silicon atoms, which form the branching points of the short-chain fraction, relative to the total product mixture is 0.6 mass-% and so is less than 1 mass-%.

Low-molecular cyclosilanes cannot be detected in the mixtures. In the $^{29}$Si-NMR spectra these would show sharp signals at δ=5.8 ppm (Si$_4$Cl$_8$), δ=−1.7 ppm (Si$_5$Cl$_{10}$), δ=−2.5 ppm (Si$_8$Cl$_{12}$), but these are not found.

Figure 3:
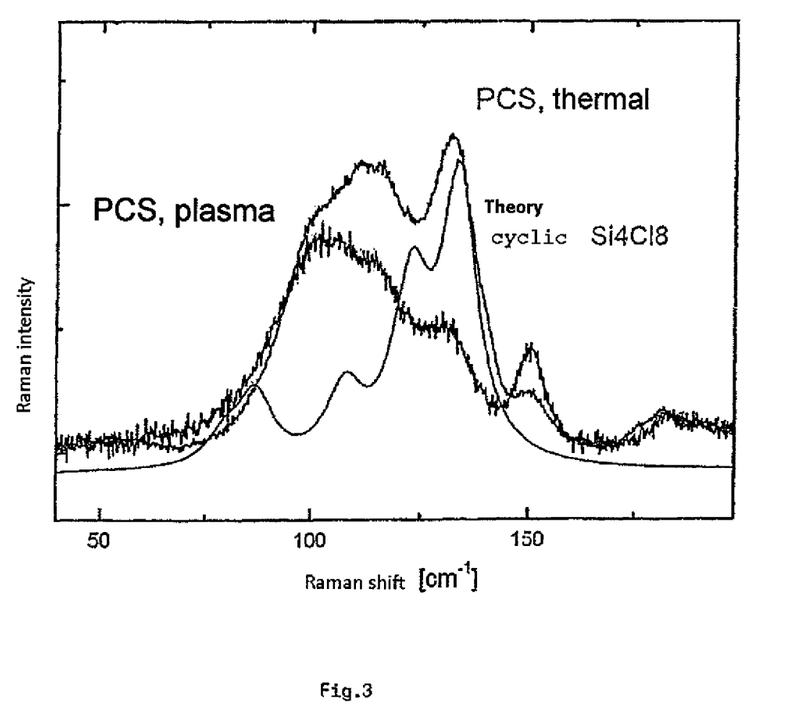
FIG. 3 shows the Raman molecular vibrational spectrum of the chlorinated polysilane made by Example 1.

A typical Raman molecular vibrational spectrum of the chlorinated polysilane is shown below (FIG. 3). The spectrum has an I$_{100}$/I$_{132}$ ratio greater than 1, i.e. the Raman intensity at 100 cm$^{-1}$ (I$_{100}$) is markedly higher than that at 132 cm$^{-1}$ (I$_{132}$). The spectrum of a thermally produced perchloropolysilane mixture and the calculated spectrum of octachlorocyclotetrasilane (Si$_4$Cl$_8$) are given for comparison, and in each case the ratio reverses to I$_{100}$/I$_{132}$ less than 1.

This diagram also shows, as an example, a section of a theoretical curve. For this, the quantum-chemically calculated modes [Hohenberg P, Kohn W. 1964. Phys. Rev. B 136:864-71; Kohn W, Sham L J. 1965. Phys. Rev. A 140: 1133-38, W. Koch and M. C. Holthausen, A Chemist's Guide to Density Functional Theory, Wiley, Weinheim, 2nd edn., 2000] are adjusted with a Multi-Lorentz peak function, which roughly simulates the experimental spectral resolution. With respect to the absolute intensity, the theoretical curve was normalized, so that it fits well in the diagram for viewing. The relative intensities of the peaks in the theory originate directly from the calculation from first principles calculation. This should show that certain intensities are typical of cyclic polysilanes. The data of the Raman spectrum point to a lower content of cyclic polysilanes in the plasma-chemically produced polysilane mixture, which is consistent with the NMR data (see above).

Example 2

A mixture of 300 sccm H$_2$ and 600 sccm SiCl$_4$ (1:2) is fed into a reactor made of quartz glass, the process pressure being kept constant in the range 1.5-1.6 hPa. Transition of the gas mixture to the plasma state is then effected by a high-frequency discharge, and the chlorinated polysilane that forms is deposited on the cooled (20° C.) quartz glass walls of the reactor. The power input is 400 W. After 4 hours the orange-yellow product is removed from the reactor by dissolving in a little SiCl$_4$. After removal of the SiCl$_4$ under vacuum, 187.7 g of chlorinated polysilane is left behind in the form of an orange-yellow viscous mass.

The average molecular weight is determined by cryoscopy and is approx. 1400 g/mol, which for the chlorinated polysilane (SiCl$_2$)$_n$ or Si$_n$Cl$_{2n+2}$ corresponds to an average chain length of approx. n=14 for (SiCl$_2$)$_n$ or approx. n=13 for Si$_n$Cl$_{2n+2}$.

The ratio of Si to Cl in the product mixture is determined after decomposition by chloride titration according to Mohr as Si:Cl=1:1.8 (which corresponds to the empirical (analytical) formula SiCl$_{1.8}$).

Figure 4:
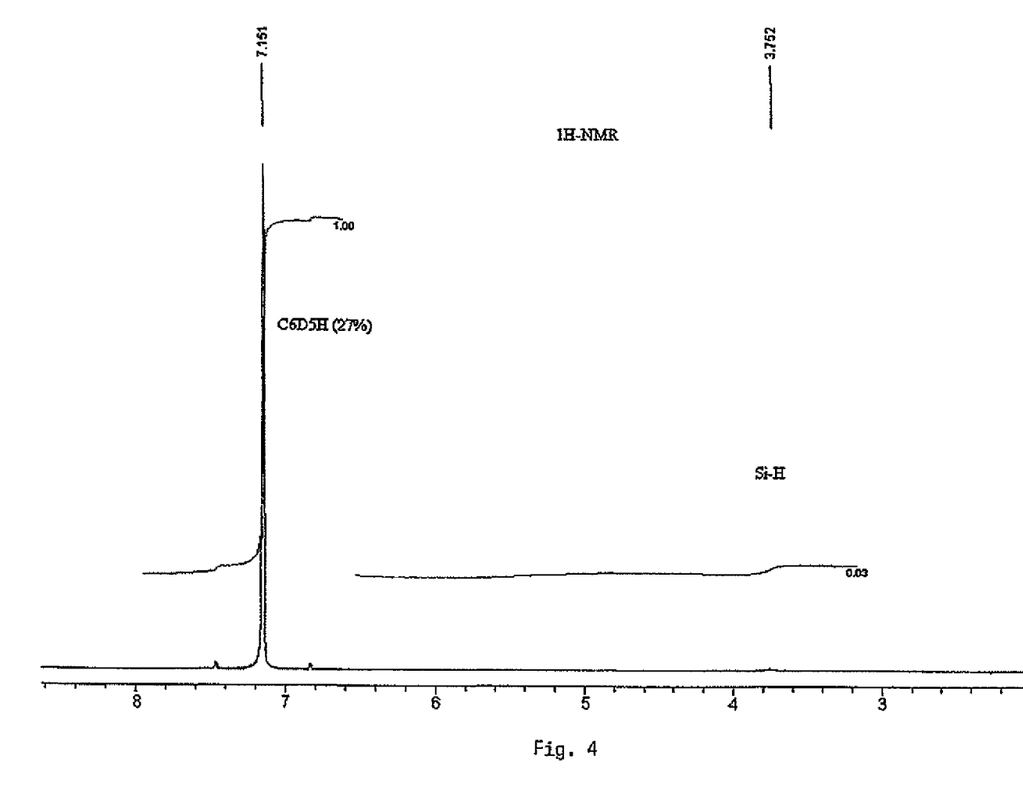
FIG. 4 shows the $^1$H-NMR spectrum of the chlorinated polysilane made by Example 2.

The hydrogen content is well below 1 mass-% (0.0008%) (also below 1 atom-%), as can be seen from the following $^1$H-NMR spectrum (FIG. 4). For this, the integrals of the solvent are compared at δ=7.15 ppm and of the product at δ=3.75 ppm.

The content of the solvent C$_6$D$_6$ is approx. 27 mass-% and its degree of deuteration is 99%.

Figure 5:
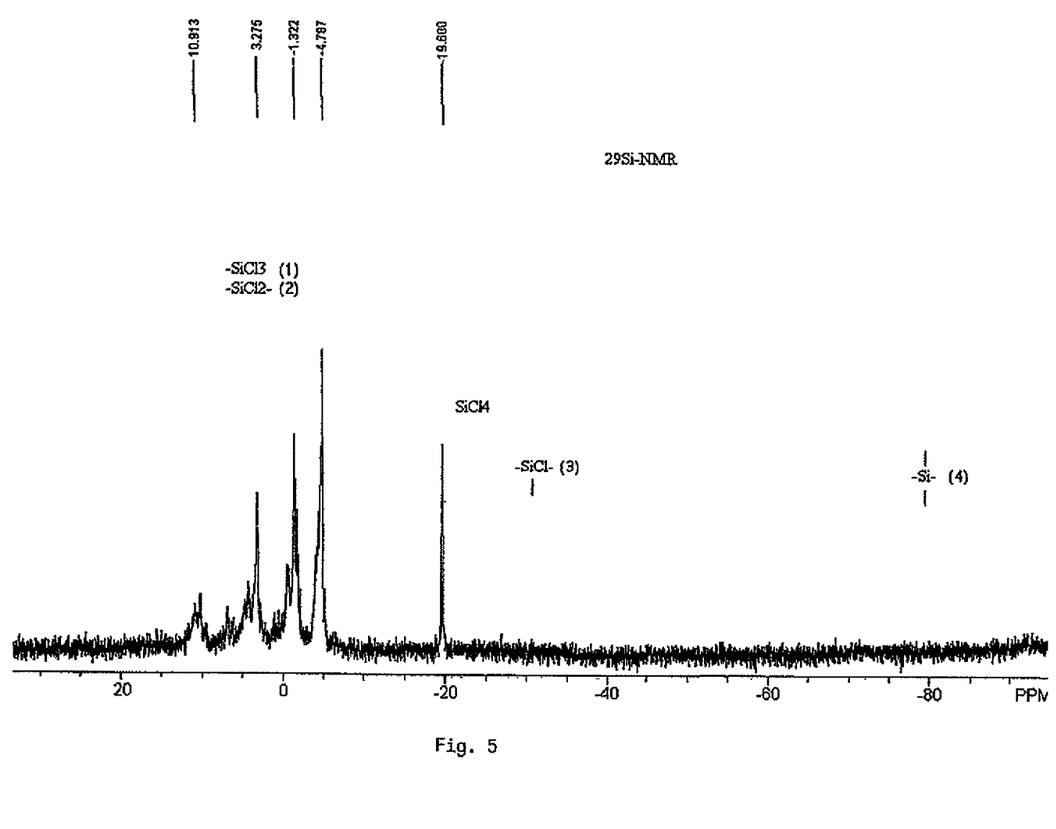
FIG. 5 shows the $^{29}$Si NMR spectrum of the chlorinated polysilane made by Example 2.

Typical $^{29}$Si-NMR shifts at approx. 10.9 ppm, 3.3 ppm, −1.3 ppm and −4.8 ppm can be seen from the following spectrum (FIG. 5). These signals are within the range of shifts at (1) and (2), which is typical of signals of SiCl$_3$ end groups (primary Si atoms), and (2), which is typical of signals of SiCl$_2$ groups (secondary Si atoms), such as they are present for example as connecting links in the region of linear chains.

The low content of short-chain branched compounds, e.g. decachloroisotetrasilane (among others δ=−32 ppm), dodecachloroneopentasilane (among others δ=−80 ppm) (these signals are within the range of shifts at (3), which is typical of signals of Si—Cl groups (tertiary Si atoms), and (4), which is typical of signals of Si groups with exclusively Si substituents (quaternary Si atoms)), can be seen from the following spectrum (FIG. 5). By integration of the $^{29}$Si-NMR spectra it can be seen that the content of silicon atoms, which form said branching points (Si—Cl groups (tertiary Si atoms) and Si groups with exclusively Si substituents (quaternary Si atoms)) of the short-chain fraction, relative to the total product mixture is 0.3 mass-% and so is less than 1 mass-%.

Low-molecular cyclosilanes could not be detected in the mixtures. These ought to show sharp signals at δ=5.8 ppm (Si$_4$Cl$_8$), δ=−1.7 ppm (Si$_6$Cl$_{10}$), δ=−2.5 ppm (Si$_6$Cl$_{12}$) in the $^{29}$Si-NMR spectra, but cannot be identified with certainty in the spectrum, as the spectrum has a large number of signals in this region.

The peak at approx. −20 ppm originates from the solvent SiCl$_4$.

Example 3

A mixture of 200 sccm H$_2$ and 600 sccm SiCl$_4$ vapor (1:3) is fed into a reactor made of quartz glass, the process pressure being kept constant in the range 1.50-1.55 hPa. Transition of the gas mixture to the plasma state is then effected by a high-frequency discharge, and the chlorinated polysilane that forms is deposited on the cooled (20° C.) quartz glass walls of the reactor. The power input is 400 W. After 2 h 9 min the orange-yellow product is removed from the reactor by dissolving in a little SiCl$_4$. After removal of the SiCl$_4$ under vacuum, 86.5 g of chlorinated polysilane is left behind in the form of an orange-yellow viscous mass.

The average molecular weight is determined by cryoscopy and is approx. 1300 g/mol, which for the chlorinated polysilane (SiCl$_2$)$_n$ or Si$_n$Cl$_{2n+2}$ corresponds to an average chain length of approx. n=13 for (SiCl$_2$)$_n$ or approx. n=12 for Si$_n$Cl$_{2n+2}$.

The ratio of Si to Cl in the product mixture is determined after decomposition by chloride titration according to Mohr as Si:Cl=1:1.7 (which corresponds to the empirical (analytical) formula SiCl$_{1.7}$).

Figure 6:
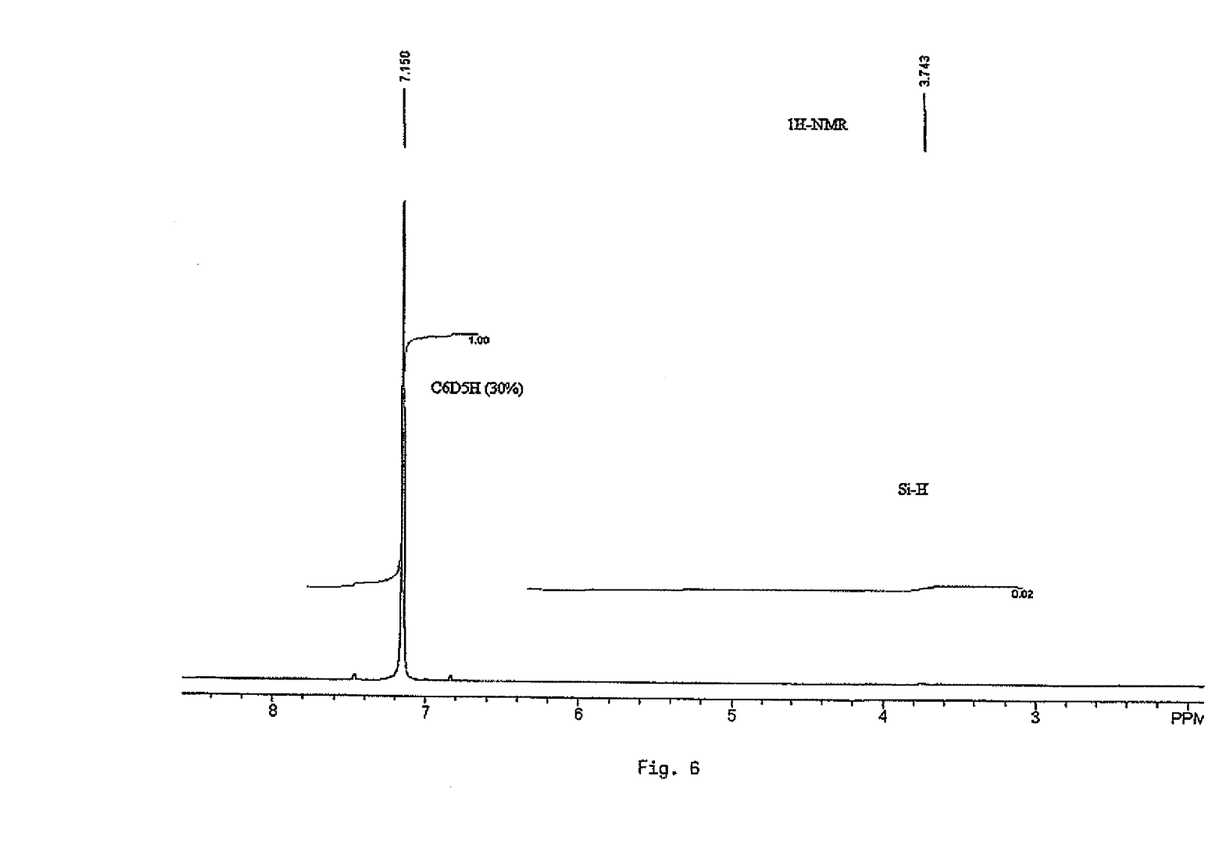
FIG. 6 shows the H'-NMR spectrum of the chlorinated polysilane made by Example 3.

The hydrogen content is well below 1 mass-% (0.0006%) (also below 1 atom-%), as can be seen from the following $^1$H-NMR spectrum (FIG. 6). For this, the integrals of the solvent are compared at δ=7.15 ppm and of the product at δ=3.74 ppm. The content of the solvent C$_6$D$_6$ is approx. 30 mass-% and its degree of deuteration is 99%.

Figure 7:
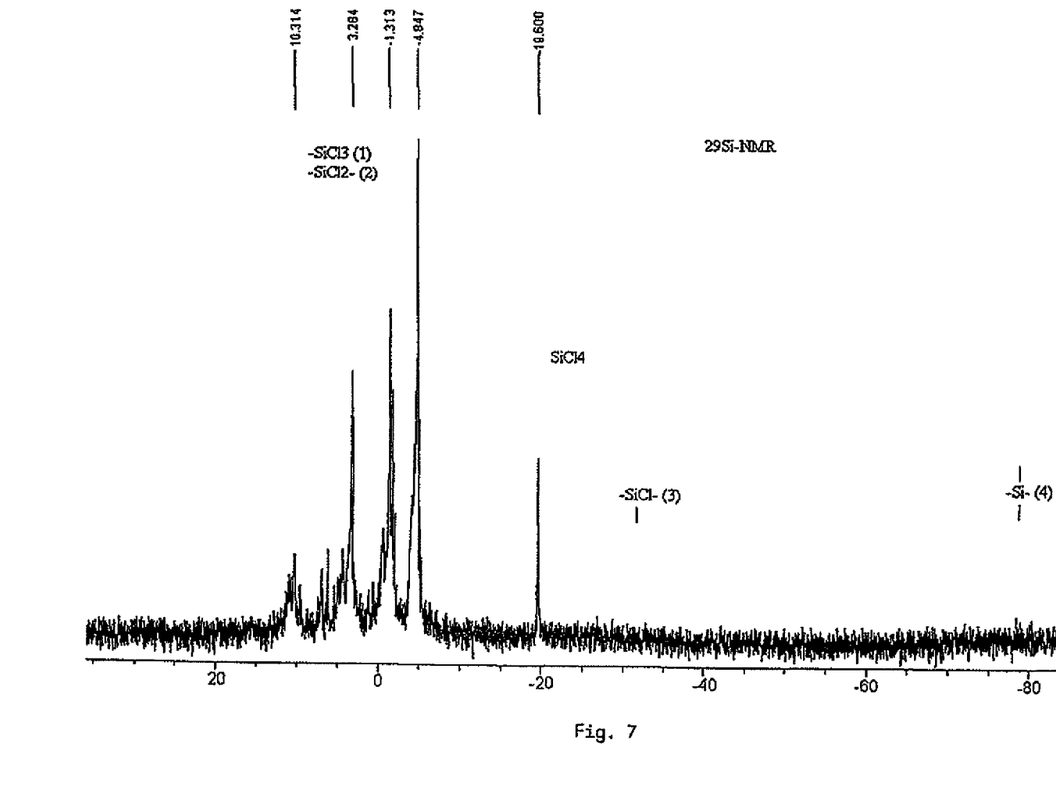
FIG. 7 shows the $^{29}$Si NMR spectrum of the chlorinated polysilane made by Example 3.

The typical $^{29}$Si-NMR shifts at approx. 10.3 ppm, 3.3 ppm, −1.3 ppm and −4.8 ppm and the low content of short-chain branched compounds, e.g. decachloroisotetrasilane (among others δ=−32 ppm), dodecachloroneopentasilane (among others δ=−80 ppm) (these signals are within the range of shifts at (3), which is typical of signals of Si—Cl groups (tertiary Si atoms), and (4), which is typical of signals of Si groups with exclusively Si substituents (quaternary Si atoms)), can be seen from the following spectrum (FIG. 7).

The low content of short-chain branched compounds, e.g. decachloroisotetrasilane (among others δ=−32 ppm), dodecachloroneopentasilane (among others δ=−80 ppm) (these signals are within the range of shifts at (3), which is typical of signals of Si—Cl groups (tertiary Si atoms), and (4), which is typical of signals of Si groups with exclusively Si substituents (quaternary Si atoms)), can be seen from the following spectrum (FIG. 7). By integration of the $^{29}$Si-NMR spectra it can be seen that the content of silicon atoms, which form the stated branching points (Si—Cl groups (tertiary Si atoms) and Si groups with exclusively Si substituents (quaternary Si atoms)) of the short-chain fraction, relative to the total product mixture is 0.6 mass-% and so is less than 1 mass-%.

Low-molecular cyclosilanes cannot be detected in the mixtures. These ought to show sharp signals at δ=5.8 ppm ($Si_4Cl_8$), δ=−1.7 ppm ($Si_5Cl_{10}$), δ=−2.5 ppm ($Si_6Cl_{12}$) in the $^{29}$Si-NMR spectra, but cannot be identified with certainty in the spectrum, as the spectrum has a large number of signals in this region.

The peak at approx. −20 ppm originates from the solvent $SiCl_4$.

Example 4

A mixture of 300 sccm $H_2$ and 240 sccm $SiBr_4$ vapor is fed into a reactor made of quartz glass, the process pressure being kept constant in the region of 0.8 hPa. Transition of the gas mixture to the plasma state is then effected by a high-frequency discharge, and the brominated polysilane that forms is deposited on the cooled (20° C.) quartz glass walls of the reactor. The power input is 140 W. After 2 hours the colorless product is removed from the reactor by dissolving in benzene. After removal of the benzene under vacuum, 55.2 g of brominated polysilane remains in the form of a white mush of crystals.

The average molecular weight is determined by cryoscopy and is approx. 1680 g/mol, which for the brominated polysilane $(SiBr_2)_n$ or $Si_nBr_{2n+2}$ corresponds to an average chain length of approx. n=9 for $(SiBr_2)_n$ or approx. n=8 for $Si_nBr_{2n+2}$.

The ratio of Si to Br in the product mixture is determined after decomposition by bromide titration according to Mohr as Si:Br=1:2.3 (which corresponds to the empirical (analytical) formula $SiBr_{2.3}$).

Figure 8:
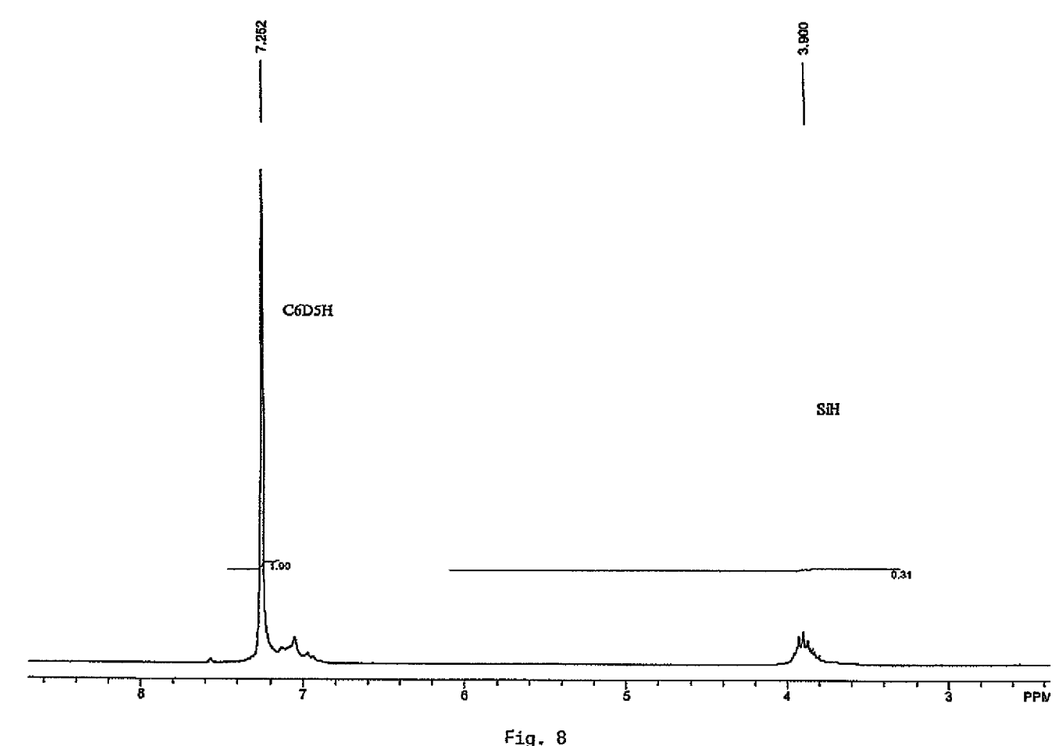
FIG. 8 shows the $^1$H-NMR spectrum of the brominated polysilane made by Example 4.

The hydrogen content is well below 1 mass-% (0.01%) (also below 1 atom-%), as can be seen from the following $^1$H-NMR spectrum (FIG. 8). For this, the integrals of the solvent are compared at δ=7.15 ppm and of the product at δ=3.9 ppm. The content of the solvent $C_6D_6$ is approx. 30 mass-% and its degree of deuteration is 99%.

Figure 9:
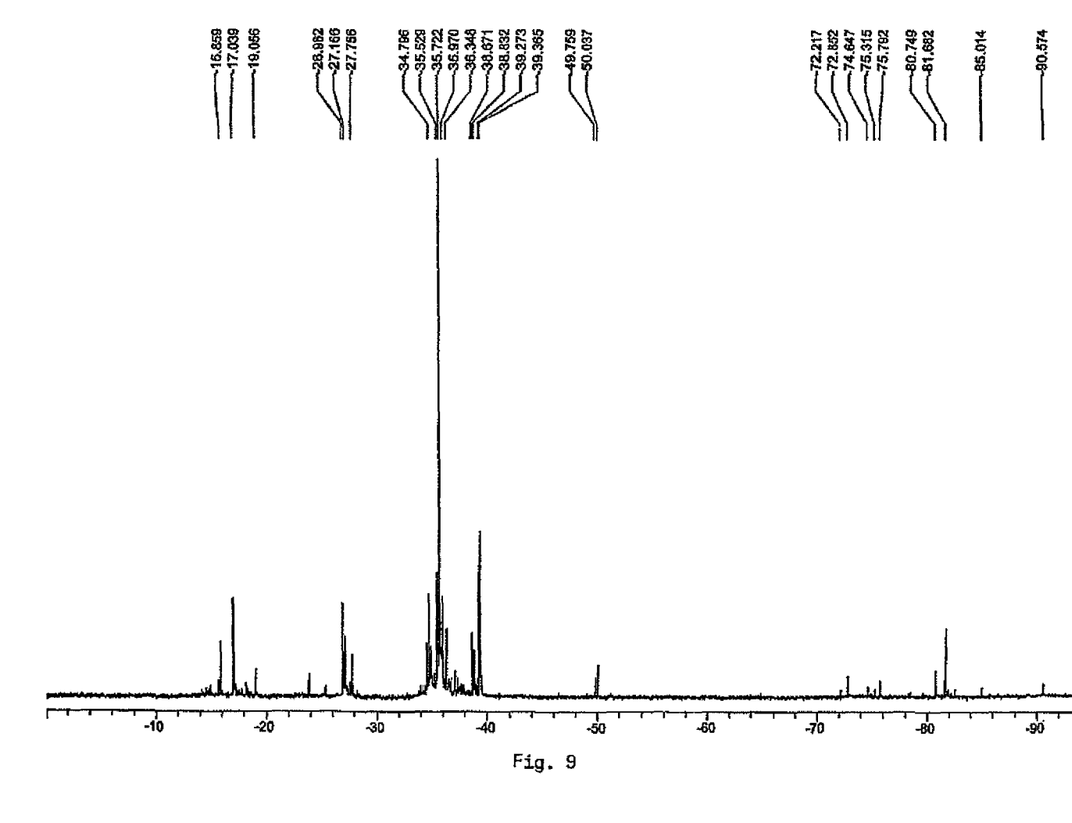
FIG. 9 shows the $^{29}$S NMR spectrum of the brominated polysilane made by Example 4.

The typical $^{29}$Si-NMR shifts (FIG. 9) appear in the range from −15 ppm to −40 ppm, from −49 ppm to −51 ppm and from −72 ppm to −91 ppm.

The peak at approx. −90 ppm originates from the educt $SiBr_4$.

Figure 10:
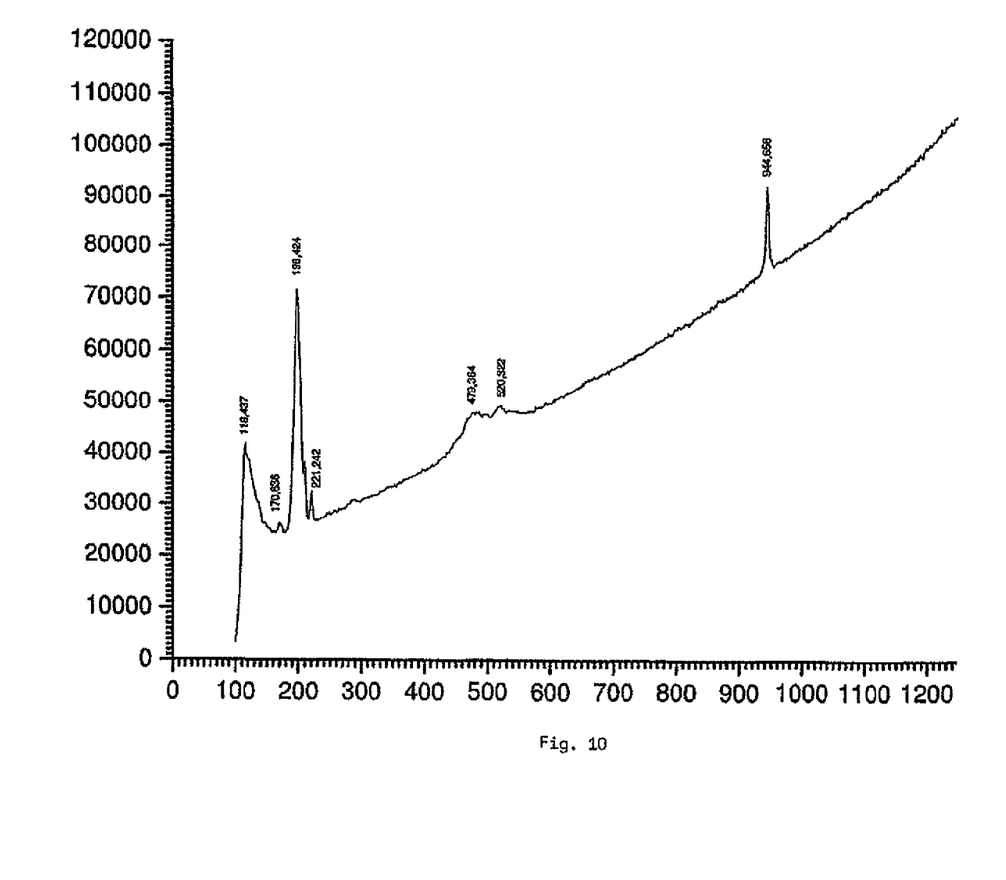
FIG. 10 shows the Raman molecular vibrational spectrum of the brominated polysilane made by Example 4.

A typical Raman molecular vibrational spectrum of the brominated polysilane is shown below (FIG. 10). The spectrum has typical Raman intensities at approx. 110 cm$^{-1}$ to 130 cm$^{-1}$, at 170 cm$^{-1}$ to 230 cm$^{-1}$, at 450 cm$^{-1}$ to 550 cm$^{-1}$ and at 940 cm$^{-1}$ to 1000 cm$^{-1}$.

Example 5

A mixture of 100 sccm $H_2$ and 50 sccm $SiF_4$ gas is fed into a plasma reactor, the process pressure being kept constant in the region of 1.2 hPa. Transition of the gas mixture to the plasma state is then effected by a high-frequency discharge, and the fluorinated polysilane that forms is deposited on the cooled (20° C.) walls of the reactor. The power input is 100 W. After 2 h the colorless to yellowish-beige-white product is removed from the reactor by dissolving in cyclohexane. After removal of the solvent under vacuum, 0.8 g of fluorinated polysilane remains in the form of a white to yellowish-beige solid.

The average molecular weight is determined by cryoscopy and is approx. 2500 g/mol, which for the fluorinated polysilane $(SiF_2)_n$ (M=66.08) or $Si_nF_{2n+2}$ corresponds to an average chain length of approx. n=38 for $(SiF_2)_n$ or approx. n=37 for $Si_nF_{2n+2}$.

Figure 11:
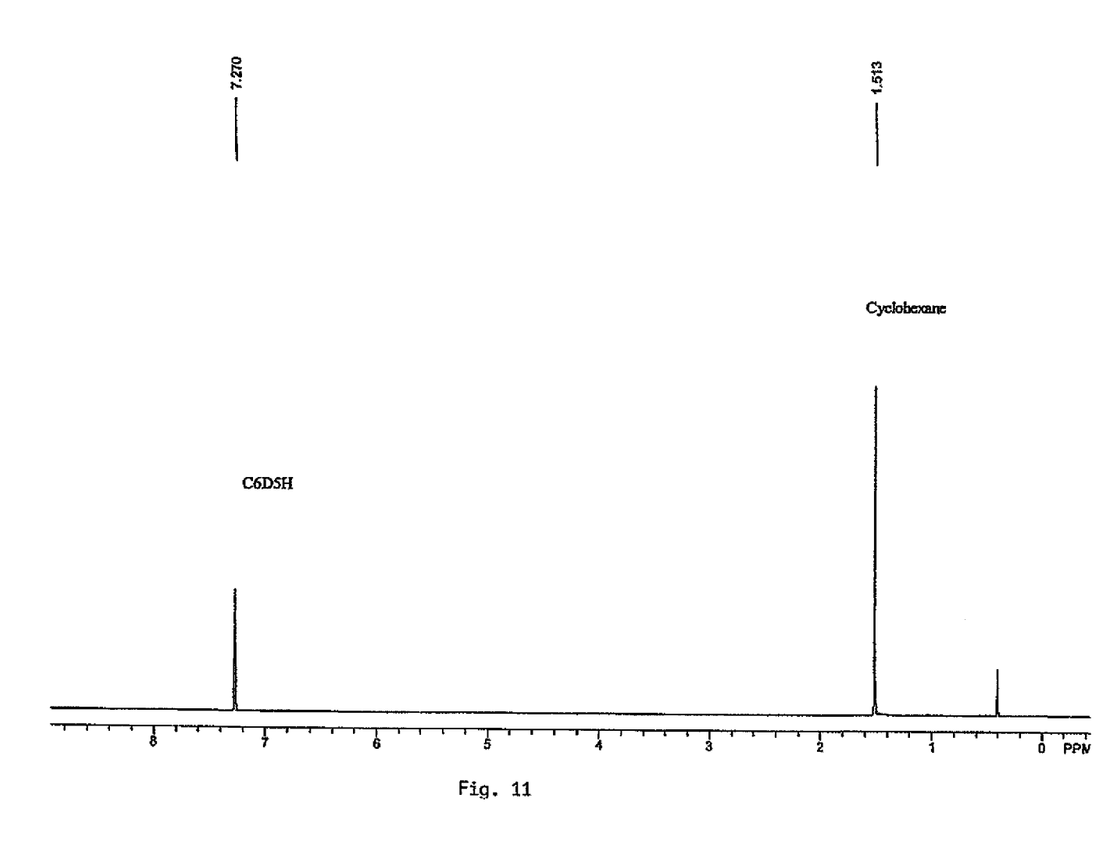
FIG. 11 shows the $^1$H-NMR spectrum of the fluorinated polysilane made by Example 5.

The hydrogen content is well below 1 mass-% (also under atom-%), as can be seen from the following $^1$H-NMR spectrum (FIG. 11).

The typical $^{29}$Si-NMR shifts of the fluorinated polysilane appear in the range from −4 ppm to −25 ppm and/or from −50 ppm to −80 ppm.

A Raman molecular vibrational spectrum of the fluorinated polysilane has typical Raman intensities at approx. 183 cm$^{-1}$ to 221 cm$^{-1}$, at approx. 497 cm$^{-1}$ to 542 cm$^{-1}$ and at approx. 900 cm$^{-1}$ to 920 cm$^{-1}$.

Example 6

A mixture of 60 sccm $H_2$ and 60 sccm $SiI_4$ vapor is fed into a reactor made of quartz glass, the process pressure being kept constant in the region of 0.6 hPa. Transition of the gas mixture to the plasma state is then effected by a high-frequency discharge, and the iodated polysilane that forms is deposited on the cooled (20° C.) quartz glass walls of the reactor. The power input is 100 W. After 2 h the reddish-yellow product is removed from the reactor by dissolving in cyclohexane. After removal of the cyclohexane under vacuum, 8 g of iodated polysilane remains in the form of a reddish-yellow to brownish solid.

The average molecular weight is determined by cryoscopy and is approx. 2450 g/mol, which for the iodated polysilane $(SiI_2)_n$ or $Si_nI_{2n+2}$ corresponds to an average chain length of approx. n=9 for $(SiI_2)_n$ or approx. n=8 for $Si_nI_{2n+2}$.

The ratio of Si to I in the product mixture is determined as Si:I=1:2.3 (which corresponds to the empirical (analytical) formula $SiI_{2.3}$).

The hydrogen content is well below 1 mass-% (also under <1 atom-%).

The typical $^{29}$Si-NMR shifts of the iodated polysilane appear in the range from −28 ppm to −52 ppm, from −70 ppm to −95 ppm and/or from −138 ppm to −170 ppm.

A typical Raman molecular vibrational spectrum of the iodated polysilane has typical Raman intensities at approx. 98 cm$^{-1}$ to 116 cm$^{-1}$, at 132 cm$^{-1}$ to 138 cm$^{-1}$, at 325 cm$^{-1}$ to 350 cm$^{-1}$ and at 490 cm$^{-1}$ to 510 cm$^{-1}$.

The invention claimed is:
1. A composition comprising a halogenated polysilane having at least one direct Si—Si bond, whose substituents consist of halogen or of halogen and hydrogen and in the composition of which the atomic ratio of substituent to silicon is at least 1:1, wherein a) the halogen is chlorine,
b) the hydrogen content of the polysilane is less than 2 atom-%,
c) the polysilane contains less than 2 mass % short-chain branched chains and rings for which n=2-6, where n is the number of Si atoms bound to each other directly, and the content of branching points of the short-chain fraction relative to the total composition is less than 1 mass %,
d) the polysilane has a Raman molecular vibrational spectrum of $I_{100}/I_{132}>1$, where $I_{100}$ denotes the Raman intensity at 100 cm$^{-1}$ and $I_{132}$ denotes the Raman intensity at 132 cm$^{-1}$, and
e) the $^{29}$Si-NMR spectra of the composition has its significant product signals in the range of chemical shift from +15 ppm to −7 ppm.

2. The composition according to claim 1, wherein the average size of the backbone chain of the halogenated polysilane is [n=]8-20.

* * * * *